W. E. WATTERS.
GRAB BUCKET.
APPLICATION FILED JAN. 10, 1912.

1,218,343.

Patented Mar. 6, 1917.
5 SHEETS—SHEET 1.

WITNESSES
R A Balderson
W Famariss

INVENTOR
Wm E. Watters,
by Bakewell, Byrnes Parmelee.
Attys.

W. E. WATTERS.
GRAB BUCKET.
APPLICATION FILED JAN. 10, 1912.
1,218,343.
Patented Mar. 6, 1917.
5 SHEETS—SHEET 2.
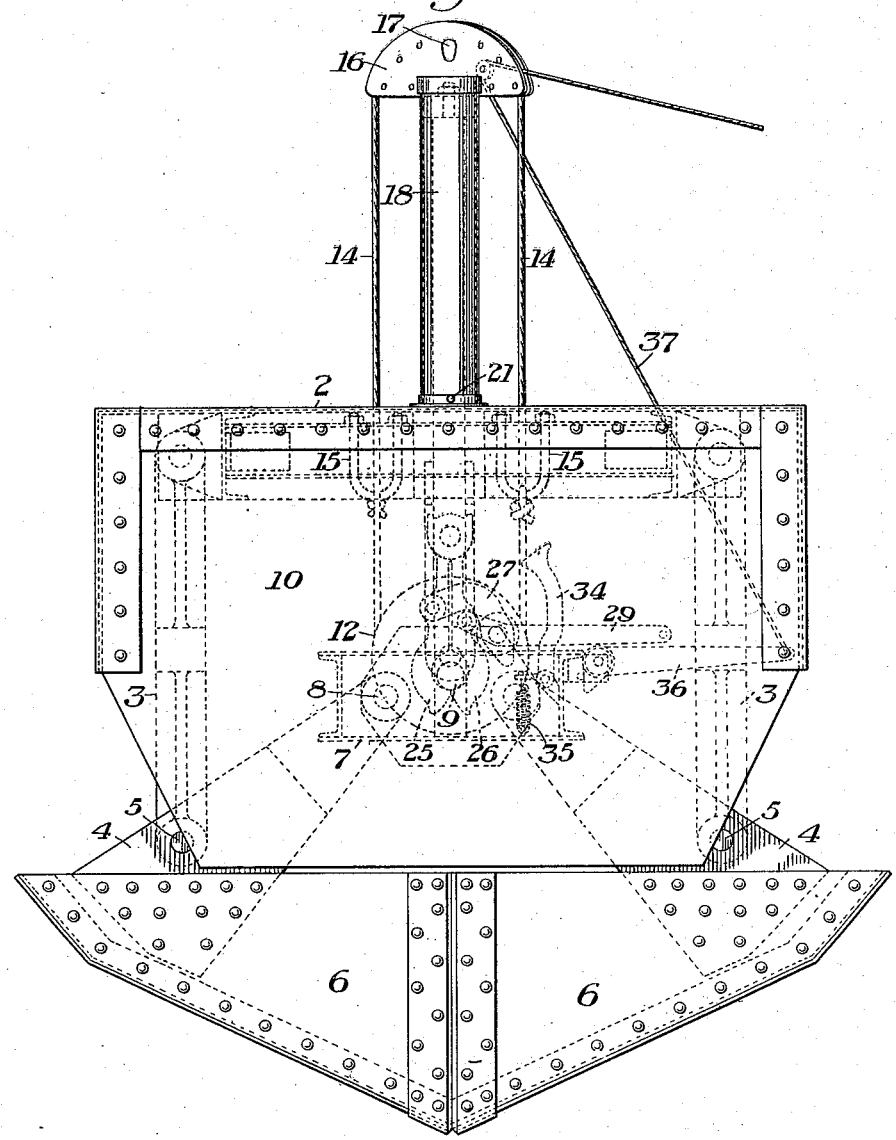
WITNESSES
INVENTOR

W. E. WATTERS.
GRAB BUCKET.
APPLICATION FILED JAN. 10, 1912.

1,218,343.

Patented Mar. 6, 1917.
5 SHEETS—SHEET 3.

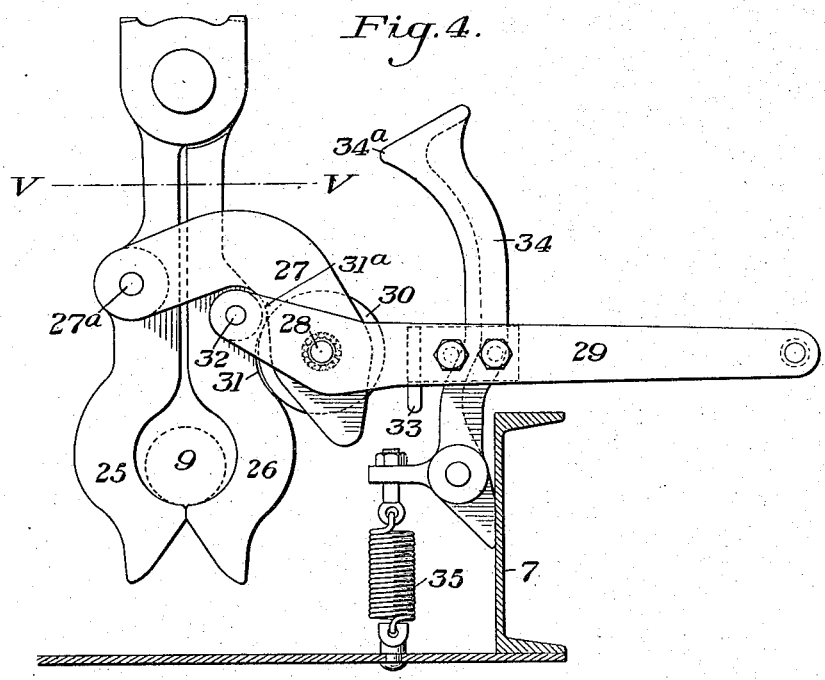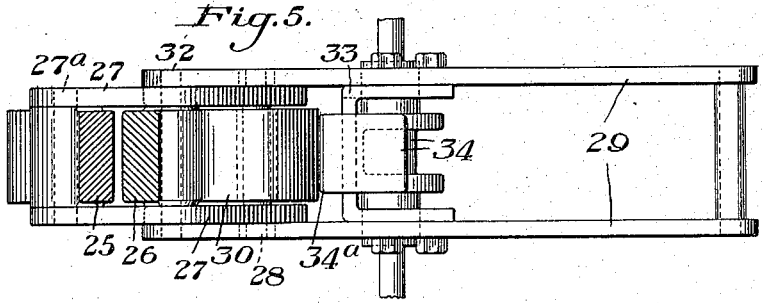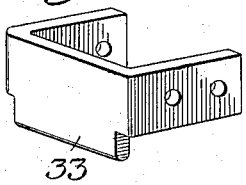

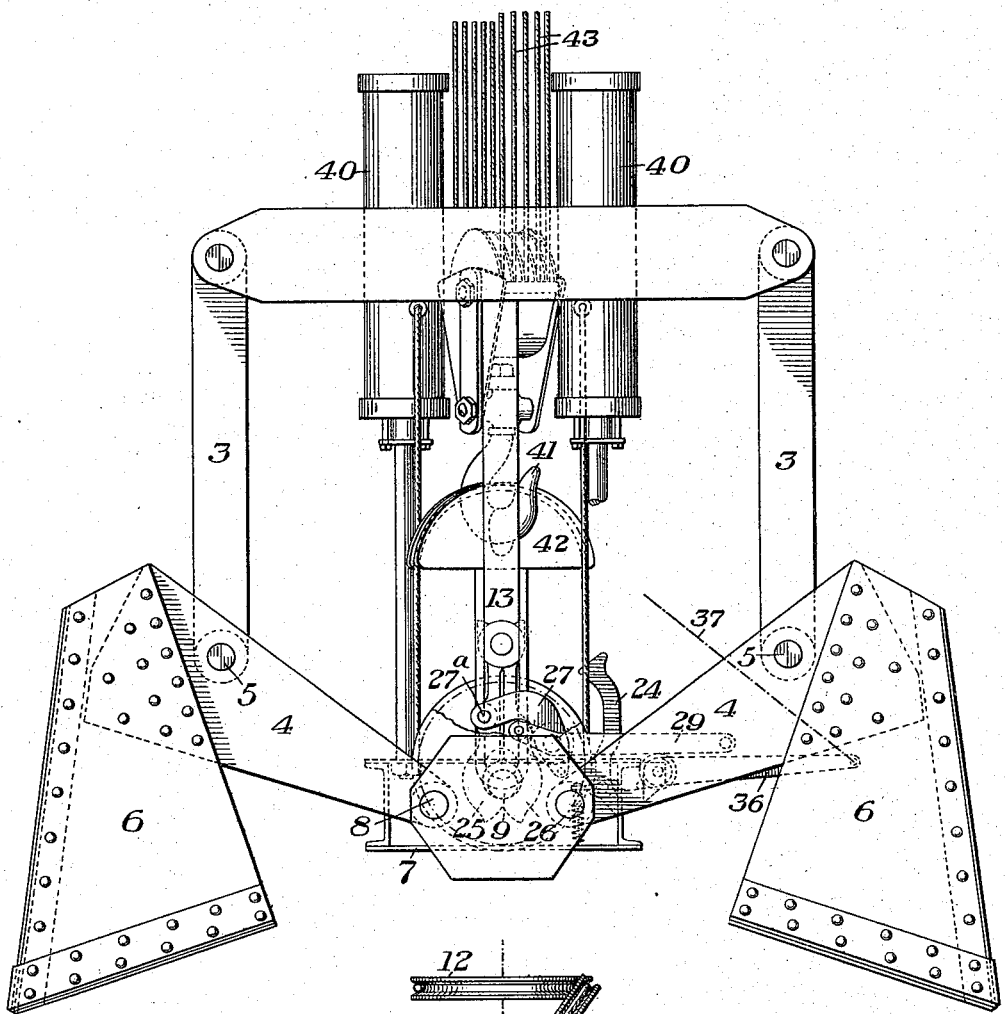

UNITED STATES PATENT OFFICE.

WILLIAM E. WATTERS, OF MAYWOOD, ILLINOIS.

GRAB-BUCKET.

1,218,343.  Specification of Letters Patent.  Patented Mar. 6, 1917.

Application filed January 10, 1912. Serial No. 670,442.

*To all whom it may concern:*

Be it known that I, WILLIAM E. WATTERS, a resident of Maywood, Cook county, Illinois, have invented a new and useful Improvement in Grab-Buckets, of which the following is a full, clear, and exact description, reference being had to the accompanying drawings, forming part of this specification, in which:—

Fig. 2 is a similar view, but showing the bucket closed;

Fig. 4 is a detail view of portions of the operating mechanism;

Fig. 5 is a sectional plan taken on the line V—V of Fig. 4;

Fig. 6 is a perspective view of the lever finger detached;

Fig. 7 is a view similar to Fig. 1, but showing the modification;

Fig. 8 is a diagrammatic plan view showing the arrangement of the cables; and

Figure 1:
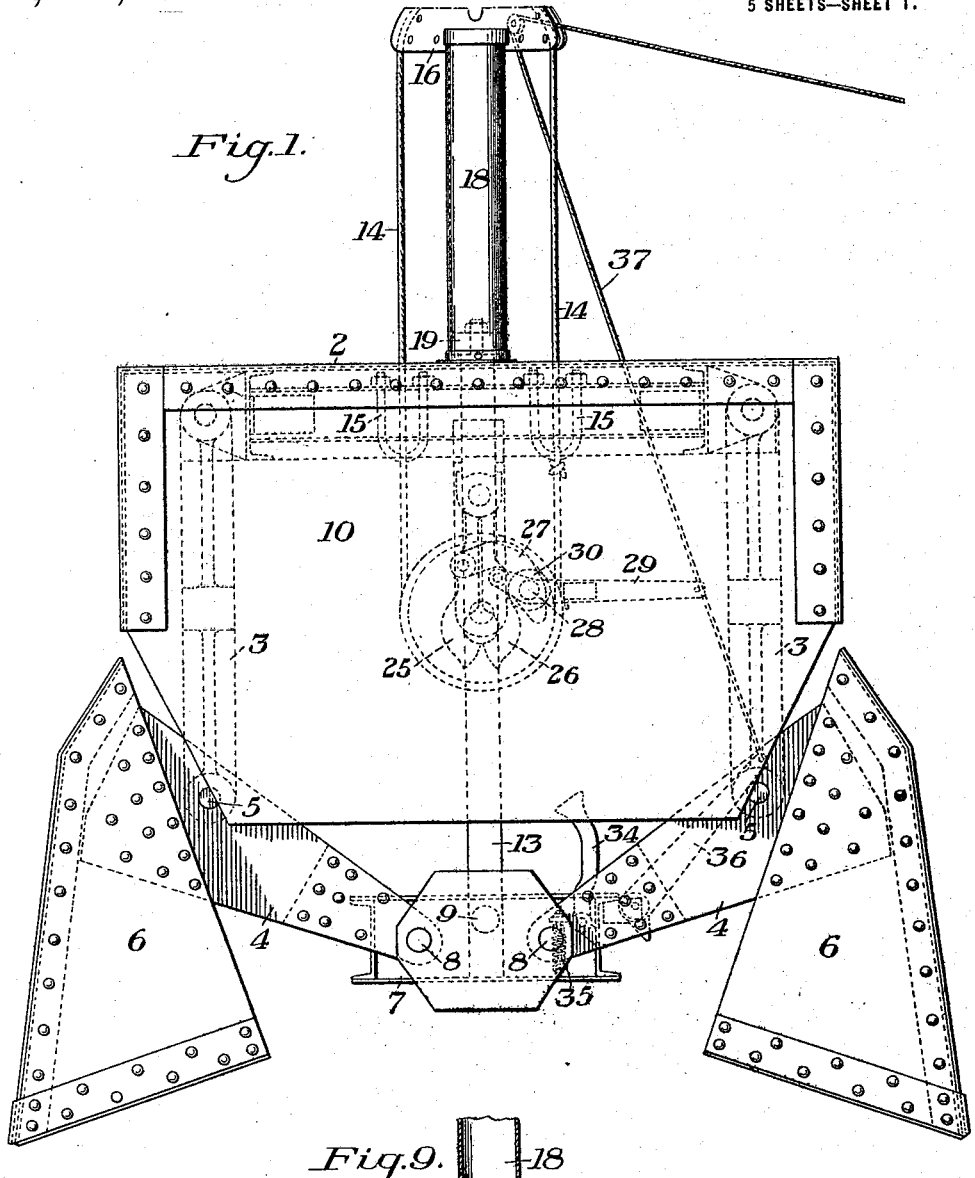
Figure 1 is a side elevation of a grab bucket embodying my invention with the bucket open.

My invention has relation to grab buckets of the single line type, and is designed to provide a bucket which can be quickly attached and detached from the hook of a standard overhead crane, and also to provide a bucket of this character of improved construction and having simple and effective operating mechanism.

The nature of my invention will be best understood by reference to the accompanying drawings, in which I have shown two different embodiments thereof and which will now be described, it being premised, however, that various changes may be made in the details of construction and arrangement of the parts without departing from the spirit and scope of my invention, as defined in the appended claims.

Referring to that form of the invention shown in Figs. 1 to 6, inclusive, the numeral 2 designates a top frame, which is rectangular in shape. Pivotally connected to each corner portion of this frame are depending links 3, whose lower ends are pivotally connected to arms 4, through the medium of the rods or shafts 5. Rigidly secured to the outer end of each arm 4 is a bucket section or digging blade 6. The other end of each arm is attached to a lower frame 7, by means of a pin 8. The lower frame 7 is also rectangular in shape, and has fitted therein a pin 9 which is adapted to be engaged by mechanism presently to be described, through which the opening and closing of the bucket is controlled.

The numeral 10 designates a hood which is secured to and depends from the top frame 2, and which incloses the links, the lower frame and also the operating mechanism. While this hood serves to protect certain parts of the mechanism its main function is to provide the necessary weight to secure the desired digging action of the bucket. It is not essential that this weight should be in the form of a hood, as any other form of weight carried by the top frame will answer the purpose equally well. The controlling mechanism consists of a housing 11, in which are journaled two sheaves 12. This housing is arranged to operate between the top frame 2 and the lower frame 7 on the two vertical guiding columns 13, which are securely attached at their lower ends to the lower frame 7, and which move freely through guides in the top frame 2. 14 designates cables, each of which is attached at one end to the top frame by means of the bolts 15, and passes thence downwardly and around one of the sheaves 12, and thence upwardly and is secured at its upper end to a yoke 16, having an eye 17, adapted to be engaged by the hook of the overhead crane. In the drawing, I have shown the two cables as actually consisting of a single continuous cable extending over the yoke in a groove thereof, as will be best understood by reference to Fig. 8.

The numeral 18 designates two cylinders which are mounted on the top frame 2, and which extend upwardly therefrom. These cylinders are open at their upper ends and are arranged to move over pistons 19, carried on the vertical rods 20, which form upward extensions of the guides 13. Each cylinder has at its lower end an inlet pipe 21, provided with a suitable check valve 22, which will permit air to flow in and will prevent the outflowing of air, and also has an escape pipe 23, provided with a hand valve 24, the degree of opening of which can be regulated at will. 25 and 26 designate two pivoted hook members carried by the housing 11, and which are adapted to engage the pin 9 of the lower frame 7, as indicated in dotted lines in Figs. 2 and 4. One of the hook members is provided with a laterally and downwardly extending arm 27, pivoted thereto at 27ᵃ, and which has a connection at 28, with an operating lever 29, to which is journaled a roller 30, adapted to engage a groove or depression 31 in the side of the adjacent hook member 26.

The lever 29 is pivoted at 32 to this hook member 26 and has a depending finger 33, which is adapted to engage a dog 34, in the manner hereinafter described. This dog is carried on the lower frame 7 and is normally held in the position shown in Fig. 1 by a spring 35.

When it is desired to disengage the hook members 25 and 26 from the pin 9, the lever 29 is raised in the manner hereinafter described, and since the lever is connected to the part 27, the latter will move about the point 27ᵃ, thereby causing the roller 30 to pass over the high point 31ᵃ, terminating the depression 31, which will allow the hook members 25 and 26 to separate or open and thus disengage themselves from the pin 9.

When it is desired to have the hook members engage the pin 9 and preparatory to closing the bucket, the mechanism descends toward this pin, which is then stationary, until the finger 33 comes in contact with the upper end of the dog or pawl 34. When this contact takes place, the descending motion of the lever 29 is suspended or stopped, while the remainder of the controlling mechanism continues to descend. This causes the roller to be raised over the high point 31ᵃ on the hook member 26, and allows the said hook members to open and pass over the pin 9. When these members have passed over said pin, the finger 33 descends over the extreme point 34ᵃ of the upper end of the pawl, which allows the parts 27 and 29 to come down into a horizontal position, thereby locating the parts as shown in Figs. 2 and 4. The spring 35 allows the pawl or dog 34 to move backward when the lower frame 7 descends upon the opening of the bucket, so that its point 34ᵃ may pass the finger 33 of the lever 29. The latch mechanism just referred to is described and claimed in my co-pending application, Serial No. 124,444, filed October 9, 1916.

The operation of the bucket is as follows: Supposing the parts to be in the open position shown in Fig. 1, in order to close the bucket, the housing 11, together with the parts carried thereby, is lowered by the crane until the finger 33 comes in contact with the dog or pawl 34, in the manner just described, thus stopping the descending motion of said lever, while the remainder of the mechanism continues to descend until the hook members 25 and 26 open and pass over the pin 9. When this occurs, the finger passes the point 34ᵃ on the pawl, allowing the mechanism to further descend and lock the hook members over the pin 9. All these parts are then raised in the vertical direction by means of the crane attached to the yoke 16. This, in turn, causes the lower frame to be raised which in turn, causes the ends of the arms 4 to be rotated about the shafts 5 of the lower ends of the links 3, and since the other ends of the arms 4 are rigidly fastened to the blades of the bucket, the latter are caused to move toward each other and eventually come into contact or into closed position, as shown in Fig. 2. To open the bucket, the lever 29 is operated to cause the roller 30 to pass over the high point 31ᵃ on the hook member 26, thereby allowing the hook members to open and disengage the pin 9. This permits the lower frame 7 to descend and the arms 4, together with the blades 6, to revolve on the shafts 5, to come into the open position and discharge the contents of the bucket.

The lever 29 may be operated in any suitable manner. In the drawing, I have shown for this purpose an actuating lever 36, arranged underneath the outer arm of the lever 29, and having an operating cord or cable 37 connected thereto. When the lever 36 is raised, it comes in contact with the other arm of the lever 29, and in turn raises that lever.

The function of the cylinders 18 and pistons 19 is solely to act as shock absorbers when the bucket opens in discharging its contents. These pistons and cylinders act in the nature of dash pots, the escape of air from the cylinders being regulated by means of the hand valves 24. This shock-absorbing feature is an extremely important one in the successful operation of a single line grab bucket, since without a device of this kind there is a severe racking action both on the parts of the bucket and on the operating crane. It is not essential that these cylinders should be attached to the top frame in such position that the piston rods shall form extensions of the guiding columns, since obviously the pistons can be attached to the lower frame in any suitable manner, and the cylinders can be suitably attached to the upper frame.

Figure 9:
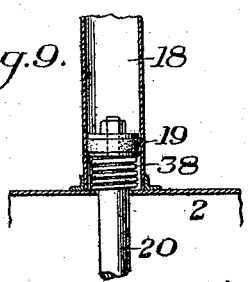
Fig. 9 is a detail view showing a further modification.
Figure 3:
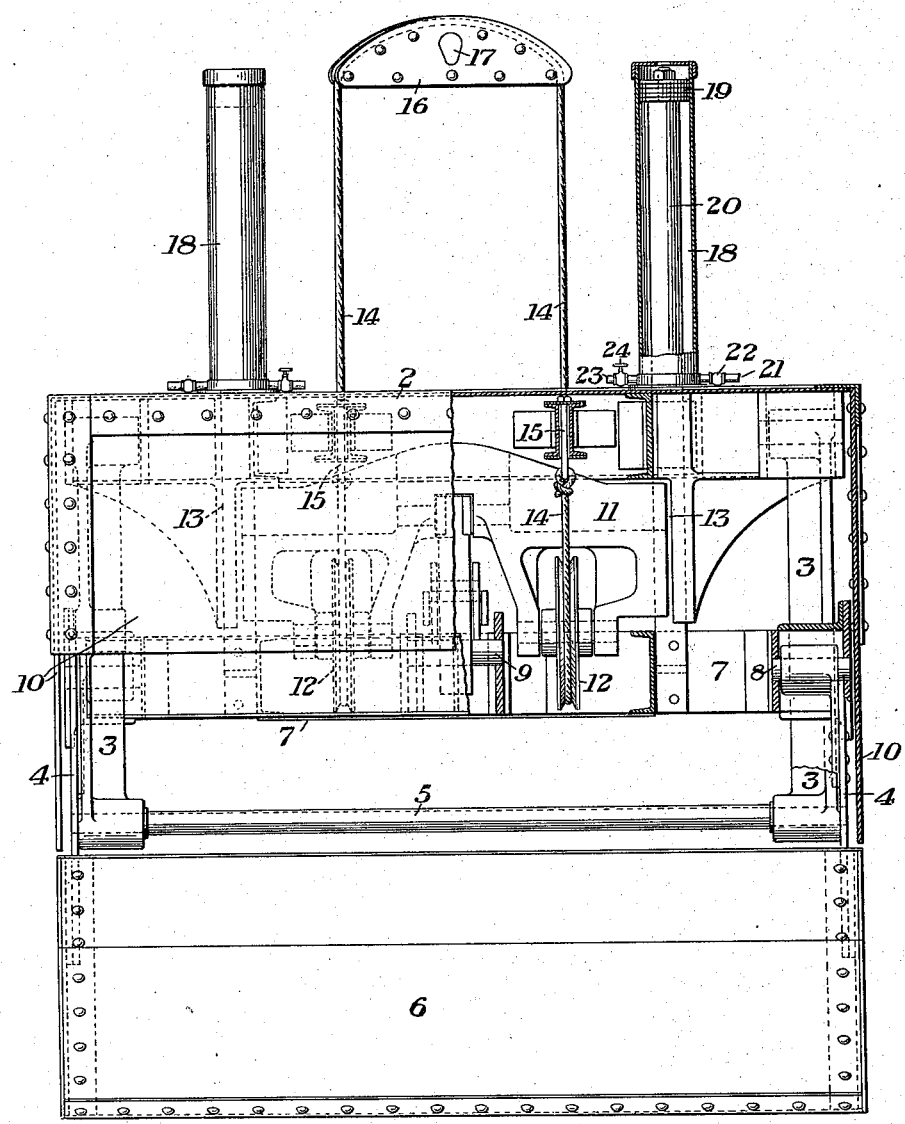
Fig. 3 is an end elevation of the bucket with certain of the parts in section.

While these cylinders give the best results in absorbing shocks in the opening of the bucket, I have also obtained very good results by the use of springs 38 such as shown in Fig. 9, which are placed around the piston rods between the upper side of the top frame and the pistons.

The modification shown in Fig. 7 is similar to that shown in the other figures, but has been designed more especially for use where the crane runways are low or the material being handled is to be piled as high as possible. To this end, the shock-absorbing cylinders 40, instead of being mounted on the top frame are so arranged as to extend partially below said frame. In this figure, I have shown the crane hook 41 as engaged with the yoke 42, corresponding to the yoke 16, first described. 43 designates the usual suspending ropes or cables for this hook.

The advantages of my invention will be apparent to those familiar with the operation of buckets of this character, since it provides a single line grab bucket which can be quickly and conveniently operated from ordinary cranes.

No change is necessary in the winding or arrangement of the crane, since the bucket is operated by a limited vertical movement of the hook block or yoke 16. This also enables the bucket to be used underneath crane runways in which there is a relatively small head room.

The bucket sections are positively opened and closed through a powerful leverage action which assists the weight of the sections.

I claim:

1. Grab bucket mechanism comprising an upper frame, a lower frame movable vertically relative to the upper frame, bucket-carrying arms attached to the lower frame, links connecting the arms and the upper frame, a controlling mechanism mounted to move vertically on guides attached to one of said frames, said guides extending through the other of said frames, a cushioning mechanism carried by one of said frames and co-acting with the other of said frames to prevent shocks to the mechanism when the bucket opens.

2. In grab bucket mechanism, an upper frame, a lower frame movable vertically relative to the upper frame, bucket-carrying arms attached to the lower frame and having a supporting connection with the upper frame, guide rods attached to one of said frames and extending through the other of said frames, and air-cushioning devices attached to the second mentioned frame and forming with the ends of the guide rods shock-absorbing mechanism for the mechanism of the bucket when said bucket unloads.

In testimony whereof, I have hereunto set my hand.

WILLIAM E. WATTERS.

Witnesses:
G. A. HART,
W. H. LANGHOFF.

Copies of this patent may be obtained for five cents each, by addressing the "Commissioner of Patents, Washington, D. C."